(12) United States Patent
Brezzi et al.

(10) Patent No.: US 11,421,755 B2
(45) Date of Patent: Aug. 23, 2022

(54) CORD LOCK

(71) Applicants: Simone Brezzi, Maserà di Padova (PD) (IT); Davide Dal Toso, Carmignano di Brenta (PD) (IT)

(72) Inventors: Simone Brezzi, Maserà di Padova (PD) (IT); Davide Dal Toso, Carmignano di Brenta (PD) (IT)

(73) Assignee: RIRI S.A., Mendrisio (CH)

( * ) Notice: Subject to any disclaimer, the term of this patent is extended or adjusted under 35 U.S.C. 154(b) by 0 days.

(21) Appl. No.: 16/786,028

(22) Filed: Feb. 10, 2020

(65) Prior Publication Data

US 2020/0256424 A1     Aug. 13, 2020

(30) Foreign Application Priority Data

Feb. 11, 2019  (IT) .......................... 102019000001935

(51) Int. Cl.
| | |
|---|---|
| *F16G 11/00* | (2006.01) |
| *F16G 11/04* | (2006.01) |
| *F16G 11/10* | (2006.01) |

(52) U.S. Cl.
CPC .......... *F16G 11/103* (2013.01); *F16G 11/044* (2013.01); *F16G 11/101* (2013.01); *Y10T 24/3969* (2015.01)

(58) Field of Classification Search
CPC .. F16G 11/10; Y10T 24/3973; Y10T 24/3978; Y10T 24/3996; Y10T 24/3967; Y10T 24/3958; Y10T 24/3909; Y10T 24/37; Y10T 24/3703; Y10T 24/3907; Y10T 24/3969; Y10T 24/39
See application file for complete search history.

(56) References Cited

U.S. PATENT DOCUMENTS

| | | | | |
|---|---|---|---|---|
| 3,633,248 A | * | 1/1972 | Speedie ................ | F16L 3/1025 24/122.3 |
| 4,635,698 A | * | 1/1987 | Anderson ............... | E06B 9/326 160/178.2 |
| 4,881,302 A | | 11/1989 | Lee | |
| 4,889,006 A | * | 12/1989 | Kolinske ................ | F16B 21/20 74/502.4 |
| 5,208,950 A | * | 5/1993 | Merritt .................... | F16G 11/14 24/115 H |
| 5,345,657 A | * | 9/1994 | Shimizu ................ | F16G 11/101 24/115 G |

(Continued)

FOREIGN PATENT DOCUMENTS

| | | |
|---|---|---|
| GB | 2163208 A | 2/1986 |
| JP | H0646510 A | 6/1994 |

(Continued)

OTHER PUBLICATIONS

Italian Patent Office Search Report issued in corresponding Italian Application No. 102019000001935 dated Nov. 4, 2019 (10 pages).

*Primary Examiner* — Robert Sandy
*Assistant Examiner* — Michael S Lee
(74) *Attorney, Agent, or Firm* — Flynn Thiel, P.C.

(57) ABSTRACT

A cord lock for adjusting the length of a cord includes a main body with a through hole, in which a cord can be inserted. A friction member is blocked in the main body in such a manner that a portion of a tooth thereof narrows the gap of the through-hole in order to limit the sliding of the cord.

17 Claims, 2 Drawing Sheets

(56) References Cited

U.S. PATENT DOCUMENTS

| | | | |
|---|---|---|---|
| 6,058,578 A | 5/2000 | Lan | |
| 6,625,849 B1* | 9/2003 | Womack | G02B 6/3616 |
| | | | 24/115 M |
| 8,302,265 B1* | 11/2012 | Gretz | E04B 9/006 |
| | | | 24/135 A |
| 2006/0168770 A1 | 8/2006 | Takahashi | |

FOREIGN PATENT DOCUMENTS

| | | |
|---|---|---|
| KR | 20010107149 A | 12/2001 |
| TW | 200410647 A | 7/2004 |

* cited by examiner

CORD LOCK

CROSS-REFERENCE TO RELATED APPLICATIONS

This claims priority from Italian Application No. 102019000001935, filed Feb. 11, 2019, the disclosure of which is hereby incorporated by reference in its entirety into this application.

FIELD OF THE INVENTION

The present invention relates to a cord lock.

TECHNOLOGICAL BACKGROUND

Cord locks are typically used to adjust the length of cords, thin strings, resilient cords and the like, for example, in clothing items.

A simple type of cord lock involves a plate which is provided with two holes which are close together and in which there is introduced the cord which is intended to be adjusted and in which a loop is thus intended to be formed. The friction of the cord in the holes of the plate prevents it from sliding. In order to adjust the position of the cord lock, it is necessary to slacken and widen the loop so as to slide the cord in the holes of the plate. The adjustment of the cord with this type of cord lock is quite difficult. Furthermore, the plate can be cumbersome or heavy. When the loop of the cord is slackened, there is also the risk that the cord may become entangled somewhere.

Another type of cord lock which is widely used is provided with a spring mechanism for adjusting the length of the cord. This cord lock comprises one or more holes, in which the cord is introduced. A movable element is urged by a spring and presses against the cord so as to block it in the hole. By means of a button, it is possible to oppose the action of the spring in order to release the cord in such a manner that it can slide in the hole. By releasing the button, the cord is again blocked in the hole by the movable element. These cord locks generally have dimensions which are relatively large because they have to receive the spring mechanism and allow the movement of the movable element. They are further subjected to malfunctions in the case of the spring giving way or the movable element becoming stuck.

STATEMENT OF INVENTION

An object of the present invention is to overcome the disadvantages of the cord lock of the known type, providing a cord lock which is reliable and simple to use, which also has small dimensions and is compact and which does not have any projecting edges. Another object of the invention is to provide a cord lock which is economic and easy to produce and assemble.

In order to achieve these objects and other objects, the invention relates to a cord lock having the features set out in the appended claims.

According to a particular aspect, a cord lock comprises a main body with a through-hole. A friction member comprises at least one tooth. The friction member is blocked in the main body. The blocking of the friction member in the main body causes at least a portion of the at least one tooth to narrow the gap of the through-hole. The sliding of a cord which is inserted in the through-hole is thereby limited and prevented until a given traction on the cord is overcome.

In a preferred embodiment, the at least one tooth has a tapered shape, preferably with a cross-section which is substantially rectangular or square. Advantageously, the friction member is provided with at least one engagement tongue. Advantageously, the engagement tongue is provided and formed on the at least one tooth of the friction member.

According to a particular aspect, the friction member has a U-bolt-like formation with two teeth which extend from a beam. There is formed on each of the two teeth a respective engagement tongue, which is preferably directed towards the beam.

According to another particular aspect, the friction member is blocked in a cavity of the main body which extends substantially transversely with respect to an axis of the through-hole. Advantageously, there extends through the cavity a cross-member which is parallel with the axis of the through-hole. In order to block the friction member, at least one engagement tongue thereof engages under the cross-member.

Preferably, the cavity widens with an opening at an external wall of the main body. The cavity extends under the opening along two channels. The channels preferably have the flanks inclined. Preferably, the channels extend beyond the through-hole, at the side opposite the opening, in order to terminate with two indentations. The channels and/or the indentations receive two respective teeth of the friction member when it is blocked in the main body.

According to another aspect, there is described a method for assembling a cord lock of the above-indicated type. The method provides for a main body and a corresponding friction member to be provided. Subsequently, a cord is introduced into the through-hole of the main body. Subsequently, the friction member is inserted in the main body until it is blocked so that at least a portion of the at least one tooth of the friction member narrows the gap of the through-hole in order to limit the sliding of the cord.

Advantageously, the friction element comprises at least one engagement tongue so that, during the assembly method of the cord lock, the blocking of the friction member in the main body includes the insertion of the friction member in the main body until the engagement tongue snap-fits under a projection, for example, in the form of a beam, which is formed in the main body.

BRIEF DESCRIPTION OF THE DRAWINGS

Additional features and advantages will be appreciated from the following detailed description of a preferred embodiment, with reference to the appended drawings, which are given purely by way of non-limiting example and in which.

DETAILED DESCRIPTION

Figures 1, 2, 3, 4, 5:
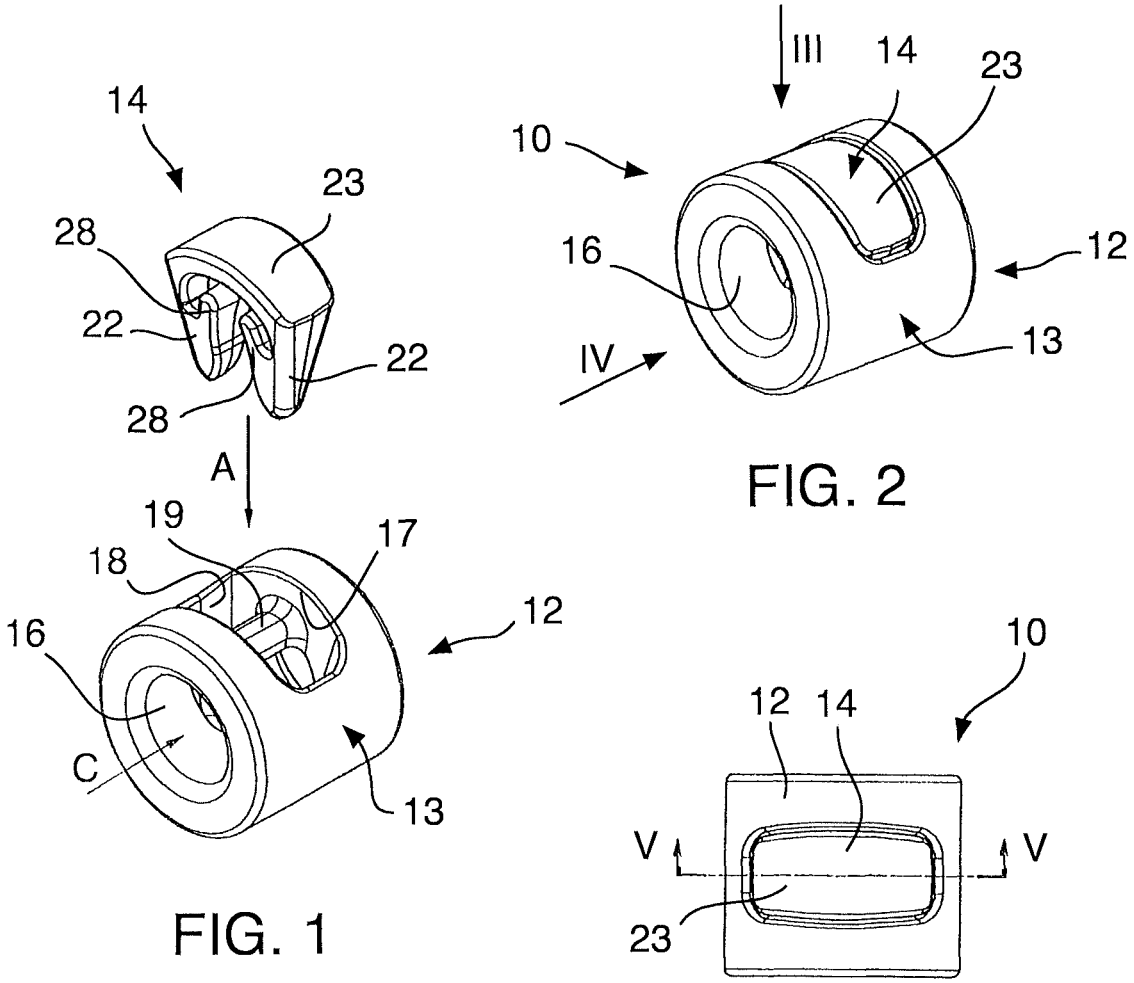
FIG. 1 is a perspective exploded view of a cord lock according to the invention.
FIG. 2 is a perspective view of the cord lock of FIG. 1 in the assembled configuration.
FIG. 3 is a view of the cord lock according to arrow III of FIG. 2.
FIG. 4 is a view of the cord lock according to arrow IV of FIG. 2.
FIG. 5 is a cross-section of the cord lock according to line V-V of FIG. 3.

With reference now to the Figures, a cord lock 10 comprises a main body 12 and a friction member 14. The main body 12 has a through-hole 16, in which during use the cord to be adjusted is introduced, in the direction of the arrow C of FIG. 1. The main body 12 illustrated in the Figures has a cylindrical external formation with an external wall 13 which is substantially cylindrical. Although the cylindrical formation of the cord lock illustrated in the Figures is particularly compact, the external shape of the main body 12 may be of any desired shape, for example, spherical, ovoid, parallelepipedal, cubic, etc. At the outer side, the main body 12 may further be decorated and embellished in different manners, for example, by means of incisions, reliefs, glazing, layers of precious metals, applications of precious stones or pietra dura, and so on. The main body 12 may be produced from metal or metal alloy, for example, zamak, or a plastics material, although the possibility of using materials of other types, such as bone or wood, is not excluded.

Figure 6:
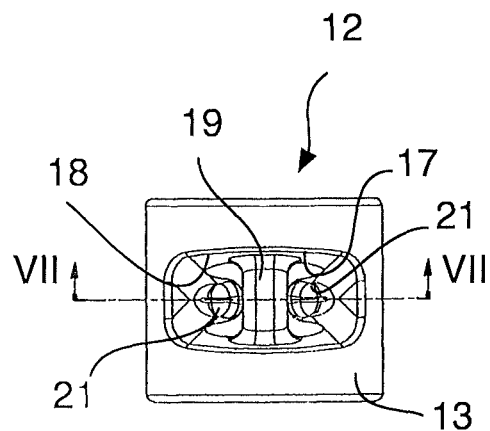
FIG. 6 is a view according to arrow III of FIG. 2 of the main body of the cord lock.
Figure 7:
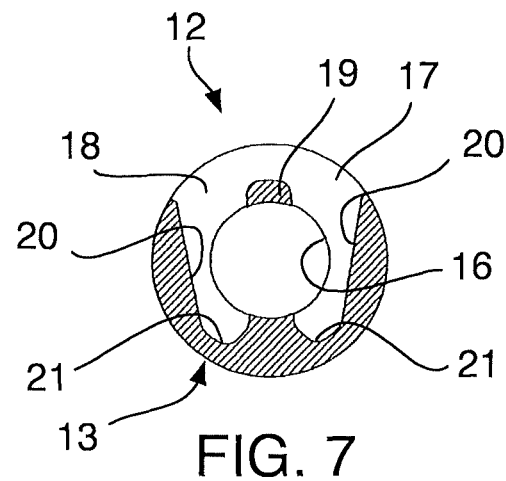
FIG. 7 is a cross-section according to line VII-VII of FIG. 6.
Figure 8:
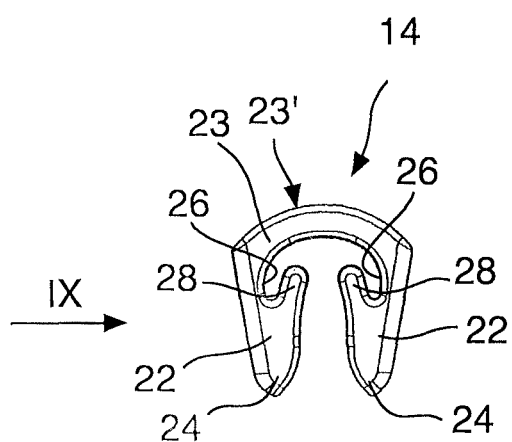
FIG. 8 is a view according to arrow IV of FIG. 2 of the friction member of the cord lock.
Figure 9:
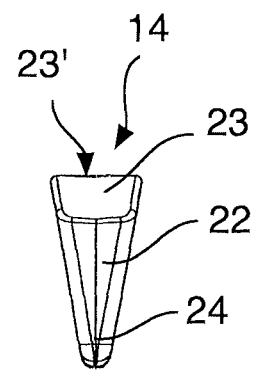
FIG. 9 is a view according to arrow IX of FIG. 8.

As can be seen in detail in FIGS. 6 and 7, there is formed inside the main body 12 a cavity 18. The cavity 18 extends inside the main body 12 in a substantially transverse direction with respect to the axis of the through-hole 16 and widens at the external wall 13 with an opening 17. The cavity 18 is formed so as to be extended under the opening 17 along two channels 20 with inclined flanks which extend beyond the through-hole 16, at the opposite side of the opening 17, in order to terminate in two indentations 21. Under the opening 17, in a position adjacent to the through-hole 16, there is formed a cross-member 19 which extends through the cavity 18 parallel with the axis of the through-hole 16.

In greater detail, the friction member 14 has a U-bolt-like formation, in which two teeth 22 extend from a beam 23. In the embodiment illustrated, the beam 23 has an arcuate external surface 23' in order to adapt to the formation of the external wall 13 of the main body 12. The formation of the external wall 23' may naturally be different from the one illustrated, for example, in order to adapt to a different shape of the external wall of the main body 12. The teeth 22 have a tapered shape with the respective inclined side walls which gradually narrow in the direction towards the ends 24 of the teeth 22. Preferably, the teeth 22 have a cross-section which is substantially rectangular or square, but it is not excluded that they may have any other cross-section, for example, circular, oval or polygonal. In a region near the beam 23, a cutout 26 in each of the teeth 22 defines an engagement tongue 28 which is directed towards the beam 23.

The cavity 18 is provided to receive the friction member 14 in the functional assembled configuration of the cord lock 10. During use, a cord is introduced into the through-hole 16 in the direction of the arrow C of FIG. 1. Subsequently, the friction element 14 is inserted in the main body 12 in the direction of the arrow A until the engagement tongues 28 snap-fit under the beam 19. In the assembled configuration which is illustrated in FIG. 2, the teeth 22 extend in the through-hole 16, partially narrowing the gap thereof, as can be seen in FIG. 4. In this manner, the teeth 22 block, by means of friction, the sliding of the cord which is inserted in the through-hole 16 of the main body. In particular, the teeth 22 act counter to traction on the cord in the direction of the arrow C of FIG. 1 since they are partially received at the flanks of the channels 20 which are formed in the cavity 18. Furthermore, the ends 24 of the teeth 22 are received in the indentations 21 in the main body 12, as can be seen in FIG. 5.

The cord can slide in the cord lock 10 when the friction force applied thereto by the friction member 14 is overcome. The force with which the friction member 14 holds the cord in the main body 12 depends on various factors, including the type of the cord itself, the diameter thereof with respect to the gap left free by the friction member 14. The force applied by the friction member 14 also depends on the material, which is soft to a greater or lesser extent, from which it is produced, and the formation of the teeth 22, in particular the cross-section thereof which is rounded to a greater or lesser extent.

Naturally, the principle of the invention remaining the same, the forms of embodiment and details of construction may be varied widely with respect to those described and illustrated without thereby departing from the scope of the present invention.

The invention claimed is:

1. A cord lock comprising:
   a main body with a through-hole; and
   a friction member installed within the main body in a single operative position in which the friction member is disposed in locking engagement with the main body so as to be non-movable relative thereto, the friction member comprising at least one tooth disposed to narrow the through-hole of the main body in the single operative position of the friction member, the at least one tooth in the single operative position of the friction member, during use of the cord lock, both limiting movement of a cord, inserted in the through-hole of the main body, relative to the main body and permitting movement of the cord relative to the main body when a sufficient force is applied to the cord.

2. The cord lock according to claim 1, wherein the at least one tooth has a tapered shape and/or a cross-section which is substantially rectangular or square.

3. The cord lock according to claim 1, wherein the friction member is provided with at least one engagement tongue disposed to maintain the friction member in the main body.

4. The cord lock according to claim 3, wherein the at least one engagement tongue is provided on the at least one tooth.

5. The cord lock according to claim 4, wherein the at least one tooth comprises two teeth and the at least one engagement tongue comprises two engagement tongues each provided on one of the two teeth, the friction member has a U-bolt-like formation including a beam and the two teeth extend from the beam, the two engagement tongues being directed towards the beam.

6. The cord lock according to claim 1, wherein the main body has a cavity and the friction member is installed in the cavity of the main body, the cavity extending substantially transversely with respect to an axis of the through-hole.

7. The cord lock according to claim 6, wherein the friction member has at least one engagement tongue and the main body has a cross-member extending through the cavity in a parallel manner with the axis of the through-hole, the at least one engagement tongue engaging under the cross-member of the main body to prevent movement of the friction member in the cavity.

8. The cord lock according to claim 6, wherein the at least one tooth comprises two teeth, the main body has an external wall with an opening and the cavity widens in a direction towards the opening and extends away from the opening along two channels having respective inclined flanks, the flanks extending beyond the through-hole at a side of the main body opposite the opening, each of the two channels terminating at an indentation, each of the two channels and the respective indentations thereof receiving one of the two teeth of the friction member.

9. A method for assembling a cord lock according to claim 1, the method comprising the steps of:
providing the main body and the corresponding friction member;
introducing a cord into the through-hole of the main body; and
inserting the friction member in the main body until the friction member is installed within the main body in the single operative position and so that the at least one tooth of the friction member narrows the through-hole of the main body.

10. The method for assembling a cord lock according to claim 9, wherein the friction member comprises at least one engagement tongue, the step of inserting the friction member in the main body comprising the step of inserting the friction member in the main body until the at least one engagement tongue snap-fits under a cross-member formed in the main body.

11. The cord lock according to claim 1, wherein in the single operative position of the friction member, both movement and restricted movement of the cord within the through-hole relative to the main body are achieved solely by frictional forces between the at least one tooth and the cord and not by movement of the at least one tooth relative to the main body.

12. The cord lock according to claim 1, wherein the at least one tooth comprises two teeth, the two teeth being first and second teeth, each of the first and second teeth having an inner face, the inner faces being disposed to narrow the through-hole and being disposed in opposed and spaced-apart relation with one another on opposite sides of the through-hole, the inner faces engaging the cord therebetween during use of the cord lock.

13. A cord lock comprising:
a main body defining therein a through-hole configured for receiving a cord therein; and
a friction member having at least one tooth, the friction member being installed in the main body such that the at least one tooth is disposed to narrow the through-hole of the main body and limit sliding of the cord relative to the main body;
the cord lock having an operative state in which the at least one tooth, without movement of the at least one tooth relative to the main body, both limits movement of the cord relative to the main body and permits movement of the cord relative to the main body when a sufficient force is applied to the cord, wherein the at least one tooth is always in the operative state once the friction member is installed in the main body.

14. The cord lock according to claim 13, wherein the main body defines therein a cavity and the friction member is disposed within the cavity, the cavity extending transversely with respect to an axis of the through-hole, the main body including a stop member disposed adjacent the cavity and the friction member includes an engagement member abutting the stop member to maintain the friction member in the main body.

15. The cord lock according to claim 13, wherein the at least one tooth comprises two teeth, the two teeth being first and second teeth, the first and second teeth being disposed in the main body such that respective portions of each of the first and second teeth narrow the through-hole and are disposed to engage the cord therebetween in the operative state of the cord lock.

16. A cord lock comprising:
a main body defining therein a through-hole configured for receiving a cord therein; and
a friction member having first and second teeth, the friction member being installed in the main body such that respective portions of each of the first and second teeth narrow the through-hole of the main body and limit sliding of the cord relative to the main body;
the cord lock having an operative state in which the first and second teeth are disposed to engage the cord therebetween, the first and second teeth in the operative state, without movement of the first and second teeth relative to the main body, both limiting movement of the cord relative to the main body and permitting movement of the cord relative to the main body when a sufficient force is applied to the cord; and
the friction member further including a beam, the friction member having a U-shape with the first and second teeth being cantilevered from opposite ends of the beam, the first and second teeth having respective free first ends remote from the beam and second ends disposed adjacent the beam and defining engagement areas abutting a stop member of the main body to maintain the friction member in the main body.

17. The cord lock according to claim 16, wherein the main body has an external wall and a cavity which opens through an opening defined in the external wall, the cavity having two channels extending away from the opening and each terminating at respective indented areas of the main body, the free first ends of the first and second teeth being engaged in the respective indented areas, and the cavity being oriented within the main body transversely to an axis of the through-hole.

* * * * *